(12) United States Patent
Lin et al.

(10) Patent No.: US 11,040,689 B2
(45) Date of Patent: Jun. 22, 2021

(54) INFLATABLE BLANKET FOR VEHICLE

(71) Applicant: GM Global Technology Operations LLC, Detroit, MI (US)

(72) Inventors: Chin-Hsu Lin, Troy, MI (US); Louis D. Thole, Grosse Pointe Park, MI (US); Mark O. Neal, Rochester, MI (US); David Acosta, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 183 days.

(21) Appl. No.: 16/216,416

(22) Filed: Dec. 11, 2018

(65) Prior Publication Data

US 2020/0180543 A1 Jun. 11, 2020

(51) Int. Cl.
*B60R 21/231* (2011.01)
*B60R 21/20* (2011.01)
*B60R 21/01* (2006.01)
*B60R 21/00* (2006.01)

(52) U.S. Cl.
CPC ............ *B60R 21/231* (2013.01); *B60R 21/20* (2013.01); *B60R 2021/0034* (2013.01); *B60R 2021/01204* (2013.01); *B60R 2021/01286* (2013.01)

(58) Field of Classification Search
CPC ..................... B60R 2021/0034; B60R 21/233
See application file for complete search history.

(56) References Cited

U.S. PATENT DOCUMENTS

| 8,657,340 | B2 * | 2/2014 | Friedman | ................ B60R 21/16 280/806 |
| 10,518,733 | B2 * | 12/2019 | Dry | ........................ B60R 21/207 |
| 2020/0031308 | A1 * | 1/2020 | Svanberg | ................ B60R 22/14 |

FOREIGN PATENT DOCUMENTS

| DE | 102014213301 A1 * | 1/2016 | ............. B60R 22/14 |
| DE | 102018206090 A1 * | 10/2019 | ............. B60R 21/18 |
| DE | 102018206091 A1 * | 10/2019 | ............. B60R 22/12 |
| DE | 102018206093 A1 * | 10/2019 | ............. B60R 21/18 |
| JP | 07108019 A * | 4/1995 | |
| JP | 09056529 A * | 3/1997 | |

* cited by examiner

*Primary Examiner* — Nicole T Verley
(74) *Attorney, Agent, or Firm* — Quinn IP Law (57) ABSTRACT

An inflatable blanket for a vehicle includes a first blanket layer, a second blanket layer coupled to the first blanket layer, and an airbag disposed between the first blanket layer and the second blanket layer. The airbag has a deflated configuration and an inflated configuration to protect a vehicle occupant when the vehicle is subjected to an external force.

13 Claims, 11 Drawing Sheets

INFLATABLE BLANKET FOR VEHICLE

INTRODUCTION

The present disclosure generally relates to vehicles, and more particularly, to an inflatable blanket for a vehicle.

Some vehicles have airbags designed separately for frontal, side, and rear protection. In other words, the vehicle may include several airbags that protect a vehicle occupant depending on the direction of the external force applied to the vehicle.

SUMMARY

The present disclosure describes an inflatable blanket for occupant protection from omni-directional forces and/or various seat orientations. The undeployed sleeping airbag will be flattened and inserted in between the blanket layers and it will just feel like a blanket to the customers. When the airbag is deployed, the airbag pressure will compress the occupant's body firmly on the bed cushion. The friction force from the airbag pressure can restrain the occupant from slipping off the seat/bed. As a result, the blanket will restrain the occupant in a highly reclined or sleep posture in the vehicle. The vehicle occupant may not need a seatbelt for protection when external forces are applied to the vehicle. However, one or more seatbelts may be a part of the inflatable blanket.

The inflatable blanket is designed for a vehicle, such as an autonomous vehicle, may include a first blanket layer, a second blanket layer coupled to the first blanket layer, and an airbag disposed between the first blanket layer and the second blanket layer. The airbag has a deflated configuration and an inflated configuration to protect a vehicle occupant when the vehicle is subjected to an external force. The inflatable blanket may use a high friction coefficient surface and airbag pressure to prevent the occupant from slipping of the vehicle seat and/or bed.

The inflatable blanket may further include a seatbelt partly disposed between the first blanket layer and the second blanket layer to selectively connect the inflatable blanket to a vehicle-occupant support of the vehicle. The airbag may be entirely disposed between the first blanket layer and the second blanket layer. The inflatable blanket may further include a main portion and a head protection portion. The head protection portion may be tucked inside the first blanket layer and the second blanket layer when the airbag is in the deflated configuration. The head protection portion extends from the main portion in the inflated configuration to protect a head of the vehicle occupant. The head protection portion may be a head protection chamber of the airbag, and the head protection chamber may be inflatable independently of a rest of the airbag. The main portion may include a main airbag, and the head protection portion is a head protection airbag. The head protection airbag may be inflatable independently of the main airbag. The airbag may include a plurality of chambers independently inflatable from each other. Further, the inflatable blanket may be configured as a sleeping bag.

The present disclosure also describes an airbag system. The airbag system includes a vehicle-occupant support configured to bear a weight of a vehicle occupant and an inflatable blanket (as described above) coupled to the vehicle-occupant support. The airbag system further includes a controller in communication with the inflatable blanket. The controller is programmed to control the deployment of the airbag of the inflatable blanket.

The controller may be programmed to: detect that the external force has been applied to the vehicle; determine a magnitude of the external force applied to the vehicle; determine a direction of the external force applied to the vehicle; and determine the current position of the vehicle seat to determine a seating orientation of the vehicle occupant. Further, the controller may also be programmed to: determine that the magnitude of the external force applied to the vehicle is greater than a predetermined magnitude threshold; determine that the direction of the external force applied to the vehicle is a predetermined direction; and determine that the current position of the vehicle seat is a predetermined vehicle position. Also, the controller is programmed to: command the airbag to deploy and the head protection portion to deploy in response to determining that the external force has been applied to the vehicle, that the magnitude of the external force applied to the vehicle is greater than the predetermined magnitude threshold, that the direction of the external force applied to the vehicle is the predetermined direction, and that the current position of the vehicle seat is the predetermined vehicle position.

The controller may also be programmed to command the airbag to deploy and suppress the head protection portion from deploying in response to determining that the external force has been applied to the vehicle, that the magnitude of the external force applied to the vehicle is greater than a predetermined magnitude threshold, that the direction of the external force applied to the vehicle is not the predetermined direction, and that the current position of the vehicle seat is the predetermined vehicle position.

The present disclosure also describes a vehicle including the airbag system described above. The vehicle includes a vehicle body and a vehicle floor coupled to the vehicle body. The vehicle floor and the vehicle body collectively define a passenger compartment. The vehicle further includes a vehicle-occupant support, such as a vehicle flat bed frame or a reclinable vehicle seat, inside the passenger compartment. The vehicle includes an inflatable blanket (as described above) coupled to the vehicle-occupant support (e.g., a reclinable vehicle seat). The vehicle further may include a first sensor configured to detect an external force applied to the vehicle. The first sensor is configured to determine a magnitude and a direction of the external force applied to the vehicle. The vehicle may further include a second sensor configured to determine a current position of the reclinable vehicle seat with respect to the vehicle floor. The vehicle further includes a controller in communication with the inflatable blanket, the first sensor, and the second sensor.

The above features and advantages and other features and advantages of the present disclosure are readily apparent from the following detailed description of the best modes for carrying out the disclosure when taken in connection with the accompanying drawings.

DETAILED DESCRIPTION

Figure 1:
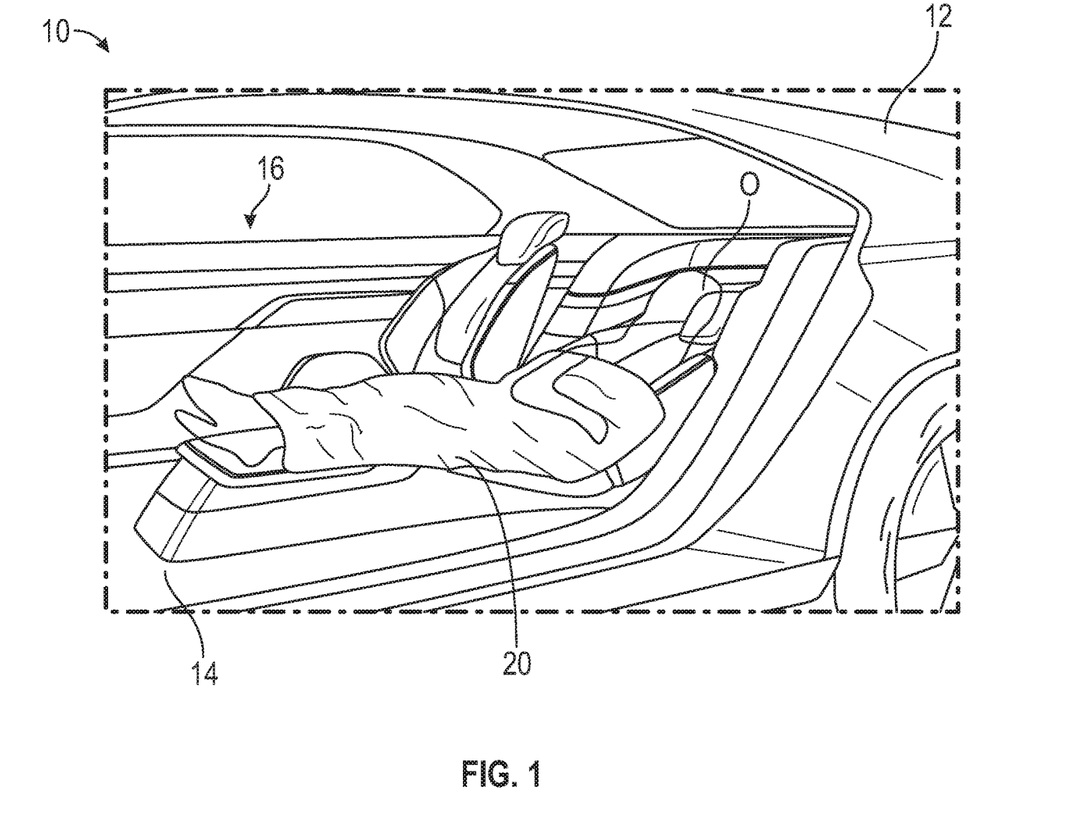
FIG. 1 is a schematic perspective view of an interior portion of a vehicle.

With reference to FIG. 1, a vehicle 10 includes a vehicle body 12 and a vehicle floor 14 coupled to the vehicle body 12. The vehicle body 12 and the vehicle floor 14 collectively define a passenger compartment 16. The vehicle 10 further includes one or more vehicle-occupant supports 18 configured to bear the weight of the vehicle occupant O. In the depicted embodiment, the vehicle-occupant supports 18 are reclinable vehicle seats that are configured to recline relative to the vehicle floor 14 to facilitate sleeping. In other embodiments (FIG. 2), the vehicle-occupant supports 18 are flat bed frames to facilitate sleeping. The vehicle 10 further includes an inflatable blanket 20 to protect the vehicle occupant O when the vehicle body 12 of the vehicle 10 is subjected to an external force EF.

Figure 2:
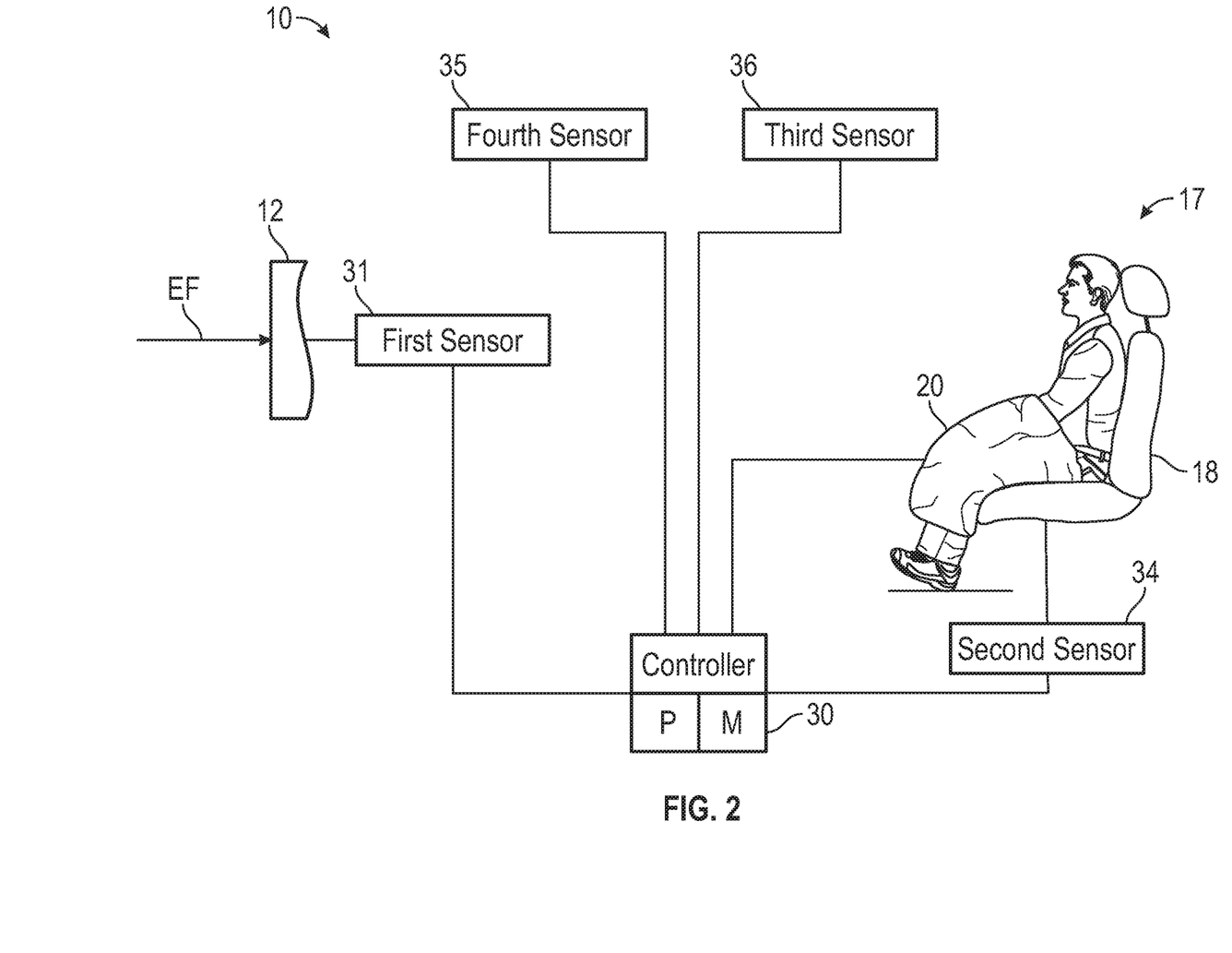
FIG. 2 is a schematic diagram of the vehicle of FIG. 1, wherein the vehicle includes an inflatable blanket and a vehicle-occupant support.
Figure 3:
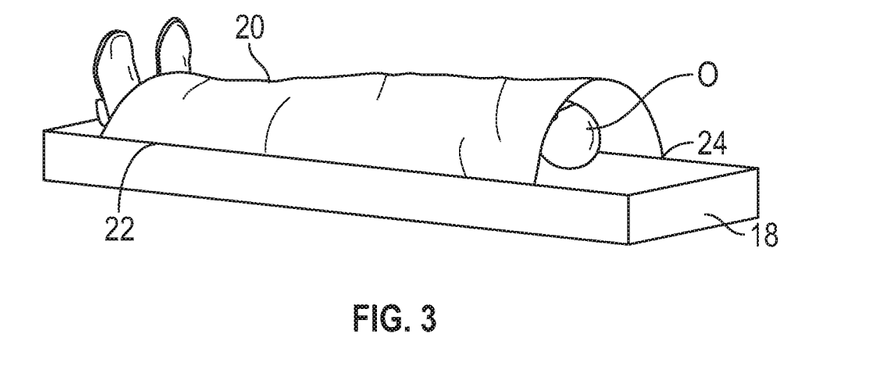
FIG. 3 is a schematic perspective view of the inflatable blanket and the vehicle-occupant support of FIG. 2, wherein the inflatable blanket is in its deflated configuration.

With specific reference to FIG. 2, the vehicle-occupant support 18 is part of an airbag system 17. The airbag system 17 is part of the vehicle 10 and includes one or more controllers 30 for, among other things, controlling the operation of the inflatable blanket. The controller 30 is therefore in communication with the inflatable blanket 20 and is programmed to send commands to the inflatable blanket 20. The term "controller" means a physical device including hardware elements such as a processor (P), circuitry including but not limited to a timer, oscillator, analog-to-digital (A/D) circuitry, digital-to-analog (D/A) circuitry, a digital signal processor, and any necessary input/output (I/O) devices and other signal conditioning and/or buffer circuitry. The memory (M) may include tangible, non-transitory memory such as read only memory (ROM), e.g., magnetic, solid-state/flash, and/or optical memory, as well as sufficient amounts of random-access memory (RAM), electrically-erasable programmable read-only memory (EEPROM), and the like. The methods described in the present disclosure may be recorded in memory (M) and executed by the processor (P) in the overall control of the inflatable blanket 20.

The vehicle 10 further includes a first sensor 31 coupled to the vehicle body 12. The first sensor 31 is configured to detect the external force EF exerted on the vehicle body 12. The first sensor 31 may include accelerometer to indirectly measure the magnitude of the external force EF by measuring the magnitude of the deceleration of the vehicle 10 when it is subjected to the external force EF. The first sensor 31 may include a gyro to determine the direction of the external force EF.

The vehicle 10 further includes a second sensor 34 coupled to the vehicle-occupant support 18 and the controller 30. The controller 30 is in communication with the second sensor 34. The second sensor 34 is configured to detect a position of the vehicle-occupant support 18 (when the vehicle-occupant support 18 is configured as a vehicle seat) relative to the vehicle floor 14. The second sensor 34 may be referred to as a seat position sensor and may be a Hall-effect sensor. For instance, the second sensor 34 is configured to detect whether the vehicle-occupant support 18 is in a neutral position or a reclined position.

The airbag system 17 further includes a third sensor 36 configured to determine the speed of the vehicle 10. Accordingly, the third sensor 36 is a vehicle speed sensor. The third sensor 36 may be attached to a wheel of the vehicle 10 to measure the speed of the rotation of the wheel, thereby measuring the speed of the vehicle 10. The airbag system 17 may further includes a fourth sensor 35 for detecting other objects around the vehicle 10. The fourth sensor 35 may be, for example, a camera and/or a lidar system for detecting the distance from the vehicle 10 to the other objects, such as other vehicles. Consequently, the controller 30 may determine whether the application of the external force EF to the vehicle 10 is imminent based on the signals received from the third sensor 36 (i.e., the vehicle speed sensor) and the fourth sensor 35 (i.e., the lidar system and/or the camera). As discussed above, airbag system 17 further includes an inflatable blanket 20 coupled to the vehicle-occupant support 18 (i.e., vehicle flat bed frame or reclinable vehicle seat).

With reference to FIGS. 4-7B, in the depicted embodiment, the vehicle-occupant support 18 is configured as a flat bed frame. The inflatable blanket 20 includes a first blanket side 22 and a second blanket side 24 opposite the first blanket side 22. The first blanket side 22 of the inflatable blanket 20 is permanently attached to the vehicle-occupant support 18 with, for example, stitching or other suitable fastener. The second blanket side 24 of the inflatable blanket 20 is removably and selectively coupled to the vehicle-occupant support 18 with, for example, a seatbelt buckle 27. The vehicle-occupant O may removably connect (using the seatbelt buckle 27) the second blanket side 24 of the inflatable blanket 20 to the vehicle-occupant support 18.

Figure 4:
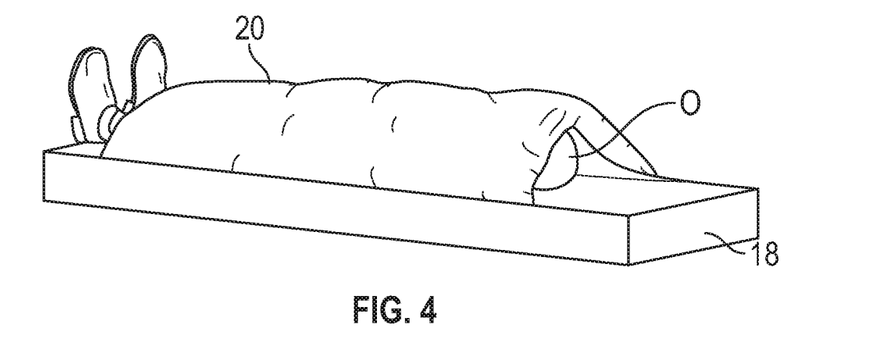
FIG. 4 is a schematic perspective view of the inflatable blanket and the vehicle-occupant support of FIG. 2, wherein the inflatable blanket is in its inflated configuration.
Figure 5:
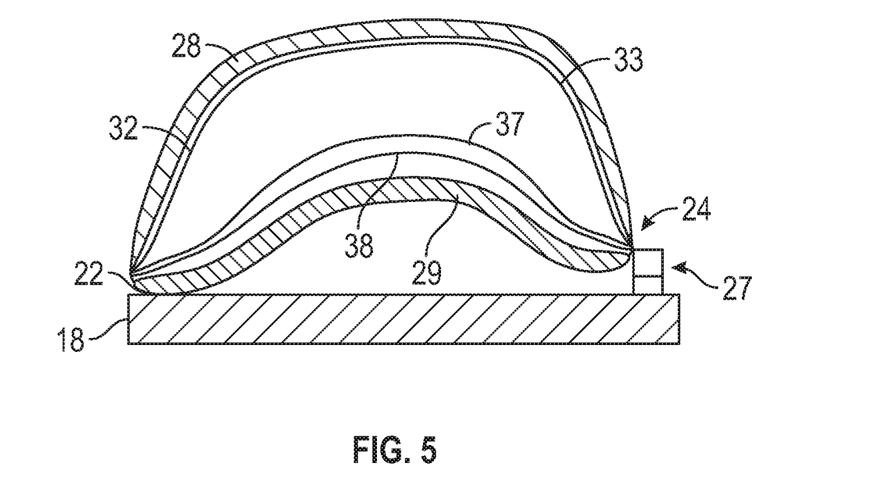
FIG. 5 is a schematic cross-sectional view of the inflatable blanket and the vehicle-occupant support of FIG. 2, wherein the inflatable blanket is in its inflated configuration.

The inflatable blanket 20 includes a first blanket layer 28 and a second blanket layer 29 coupled to the first blanket layer 28. The first blanket layer 28 may be referred to as the top layer, and the second blanket layer 29 may be referred to as the bottom layer. The inflatable blanket 20 further includes an airbag 32 disposed between the first blanket layer 28 and the second blanket layer 29. The airbag 32 has a deflated configuration and an inflated configuration to protect a vehicle occupant O when the vehicle 10 is subjected to the external force EF (FIG. 2). In the depicted embodiment, the airbag 32 has a first airbag panel 33 and a second airbag panel 37 coupled to the first airbag panel 33. The airbag 32 is sewn together with the first blanket layer 28 and the second blanket layer 29. The first airbag panel 33 and the first blanket layer 28 may be sewn together, and the second airbag panel 37 and the second blanket layer 29 may be sewn together. The first airbag panel 33 and the second airbag panel 37 may also be stitched together to create desired bag shapes. The airbag 32 may be entirely disposed between the first blanket layer 28 and the second blanket layer 29 to properly secure the airbag 32 within the inflatable blanket 20.

The airbag system 17 may further include one or more seatbelts 38 partly disposed between the first blanket layer 28 and the second blanket layer 29 to selectively connect the inflatable blanket 20 to the vehicle-occupant support 18 through the seatbelt buckle 27. Thus, the seatbelt 38 is coupled to the seatbelt buckle 27. The seatbelt 38 may be sewn together with the second blanket layer 29 to provide further protection for the vehicle occupant O. It is contemplated that the seatbelts 38 and may have various paths. For instance, the seatbelts 38 may pass through both shoulders of the vehicle occupant O and/or cross the chest of the vehicle occupant O from one side to the opposite side of the vehicle-occupant support 18.

Figure 6A:
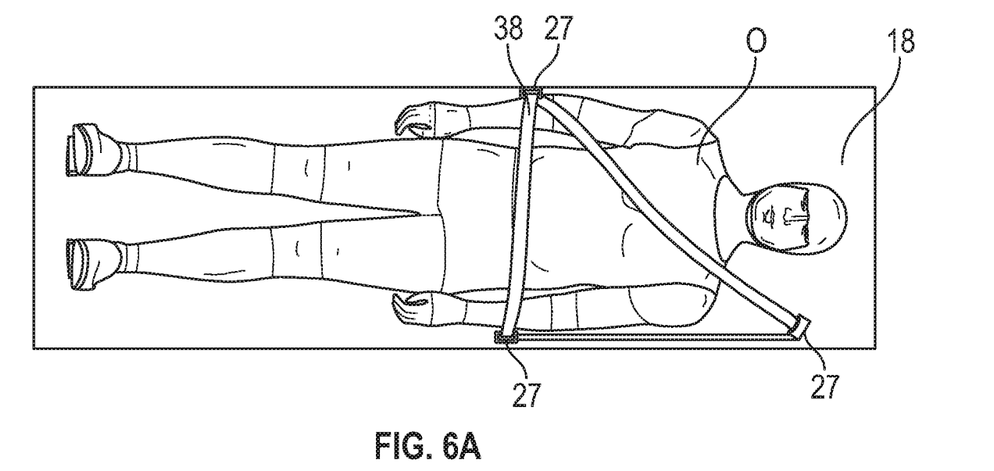
FIG. 6A is a schematic top view of a vehicle support of the vehicle of FIG. 1, including a 3-point seatbelt.
Figure 6B:
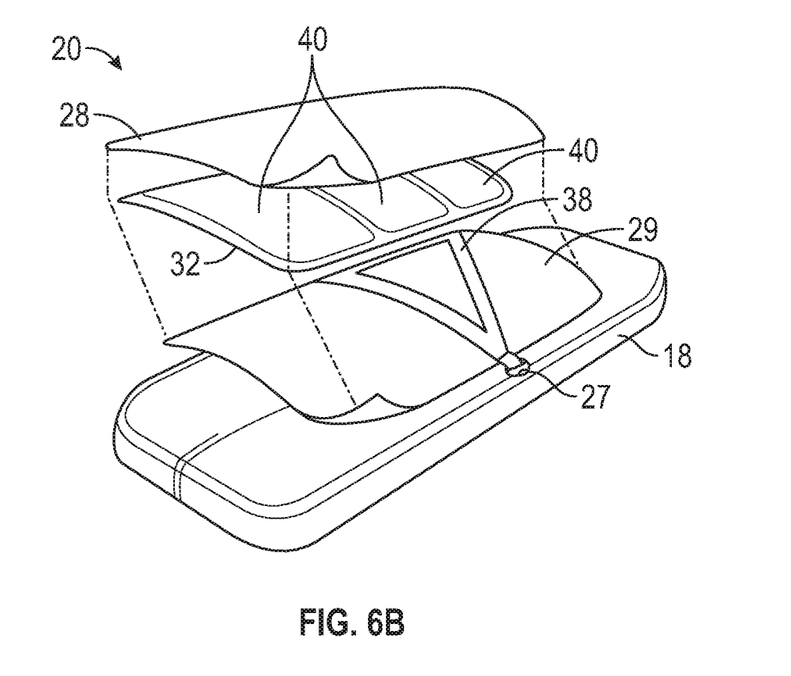
FIG. 6B is a schematic perspective, exploded view of a vehicle-occupant support and an inflatable blanket with 3-point seatbelt stitched to the inner layer of the blanket.

As shown in FIGS. 6A and 6B, the seatbelt 38 may be a 3-pt belt, including: one buckle 27 at the left waist, one buckle 27 at the right waist, and the third buckle 27 at the shoulder. The belt 38 is directly attached (e.g., stitched) to the second blanket layer 29 (e.g., the inner blanket layer) of the inflatable blanket 20 for further protection of the vehicle occupant O. The airbag 32 is positioned between the first blanket layer 28 and the second blanket layer 29. The airbag 32 may include a plurality of chambers 40 independently inflatable from each other.

Figure 7A:
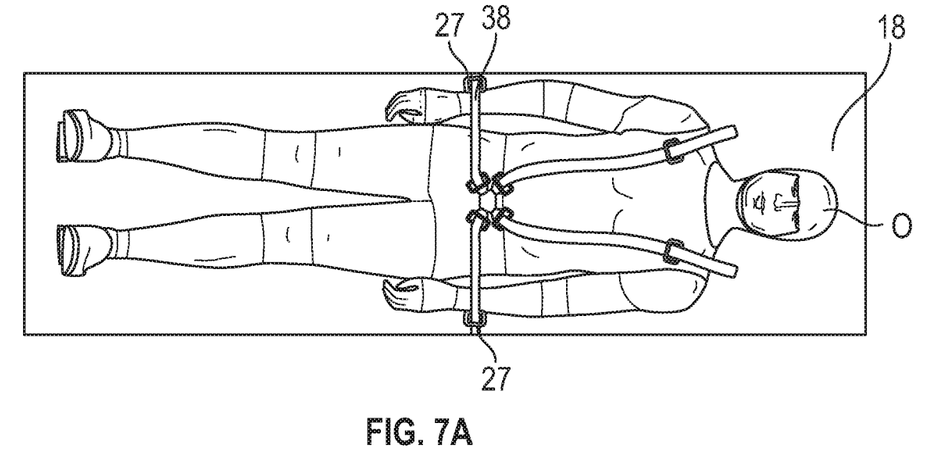
FIG. 7A is a schematic top view of the vehicle support of the vehicle of FIG. 1, including a 4-point seatbelt.
Figure 7B:
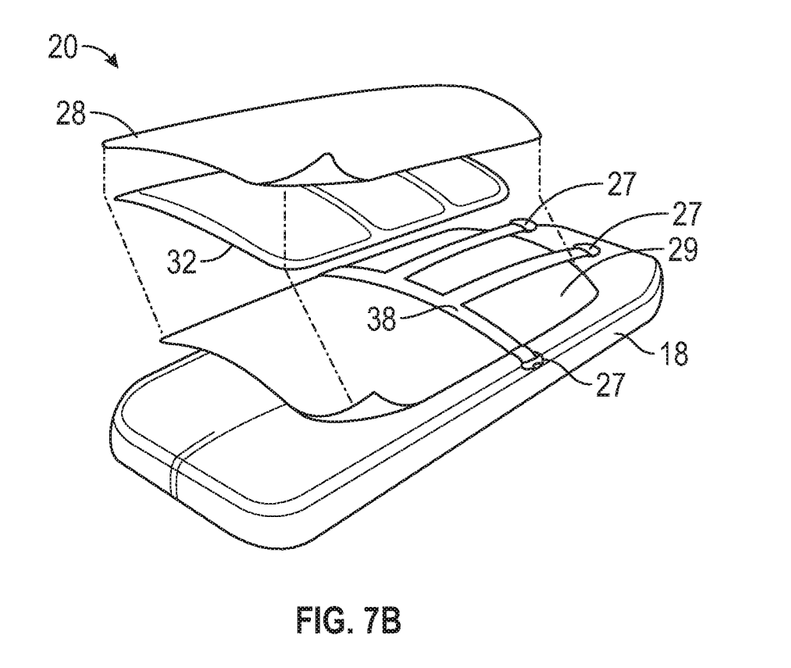
FIG. 7B is a schematic perspective, exploded view of a vehicle-occupant support and an inflatable blanket with a 4-point seatbelt stitched to the inner layer of the blanket.

As shown in FIGS. 7A and 7B, the seatbelt 38 may be a 4-point belt (with four buckles 27) used in racing scenarios. The belt 38 is directly attached (e.g., stitched) to the second blanket layer 29 (e.g., the inner blanket layer) of the inflatable blanket 20 for further protection of the vehicle occupant O. The airbag 32 is positioned between the first blanket layer 28 and the second blanket layer 29. The airbag 32 may include a plurality of chambers 40 independently inflatable from each other.

Figure 8:
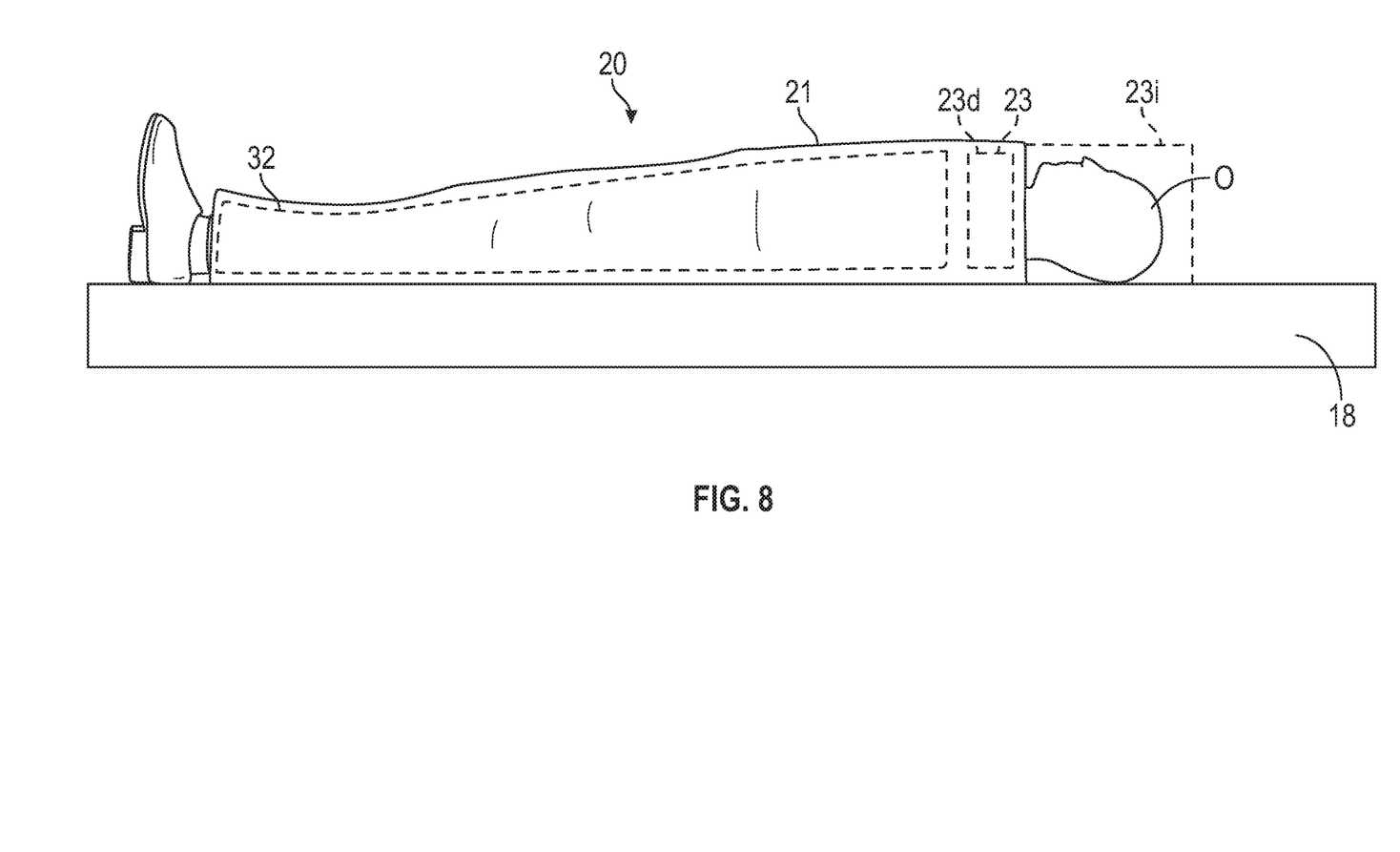
FIG. 8 is a schematic side view of a vehicle-occupant support and an inflatable blanket, wherein the inflatable blanket includes a head protection portion.

With reference to FIG. 8, the inflatable blanket 20 may include a main portion 21 and a head protection portion 23 to protect the head of the vehicle occupant O. The head protection portion 23 is tucked inside the first blanket layer 28 and the second blanket layer 29 when the airbag 32 is in the deflated configuration as designated by reference character 23d. Further, the head protection portion 23 extends from the main portion 21 in the inflated configuration (as designated by reference character 23i and see also FIG. 4) to protect a head of the vehicle occupant O. The head protection portion 23 may be a head protection chamber of the airbag 32, which is inflatable independently of a rest of the airbag 32 (i.e., independently of the main portion 21 of the airbag 32). The airbag 32 may be the main airbag, and, instead of a chamber of the airbag 32, the head protection portion 23 may an independent airbag and may therefore be referred to as a head protection airbag, which is inflatable independently of the main airbag (i.e., airbag 32). It is contemplated that the inflatable blanket 20 may not include the head protection portion 23 and therefore does not cover the head of the vehicle occupant either in the inflated configuration or the deflated configuration.

Figure 9A:
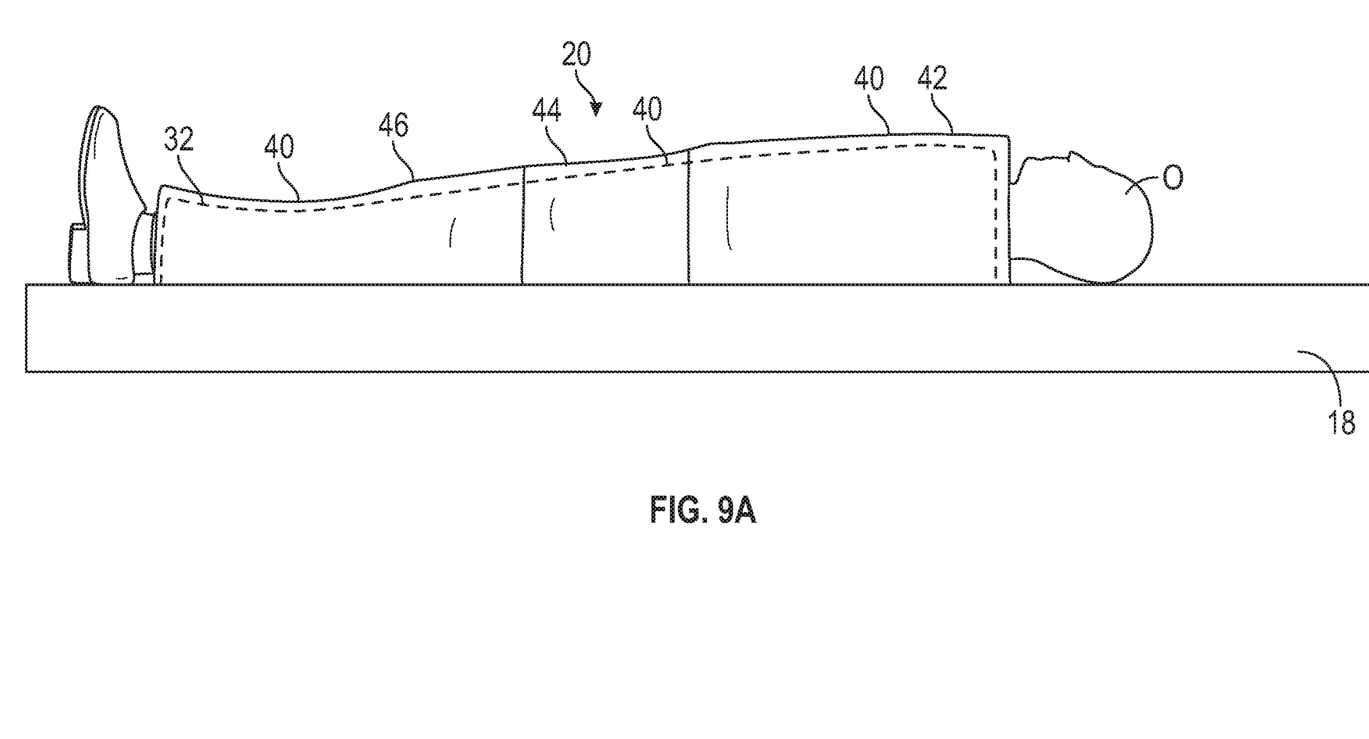
FIG. 9A is a schematic side view of a vehicle-occupant support and an inflatable blanket including a plurality of chambers.
Figure 9B:
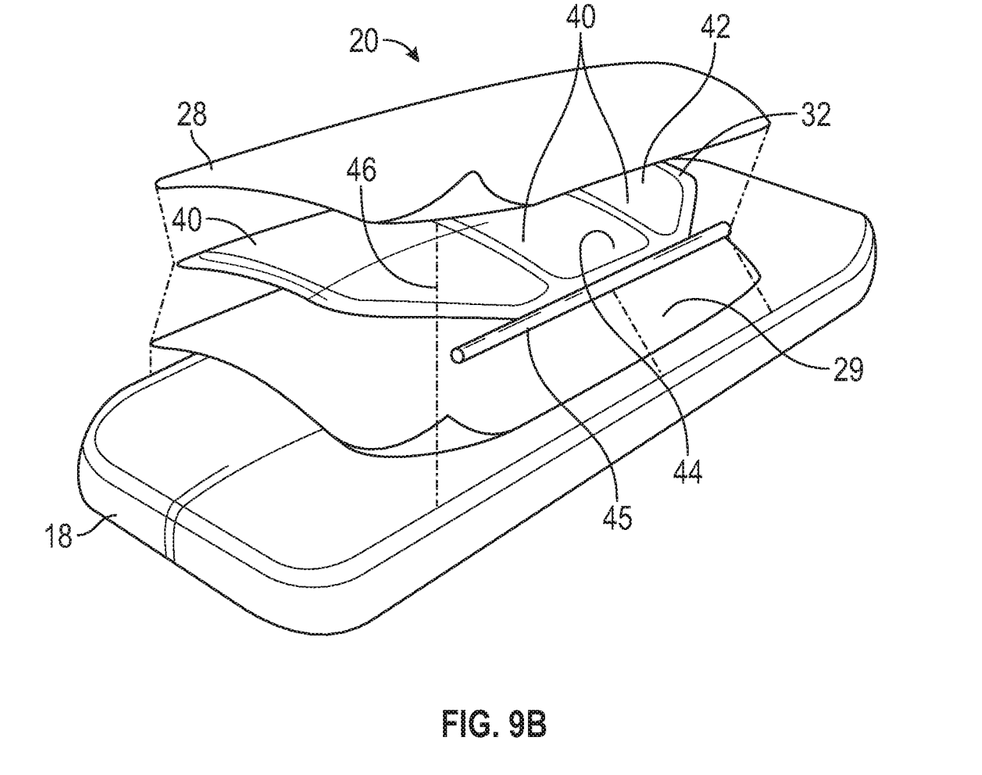
FIG. 9B is a schematic perspective, exploded view of a vehicle-occupant support and an inflatable blanket including a plurality of chambers.

With reference to FIGS. 9A and 9B, the airbag 32 of the inflatable blanket 20 may include a plurality of chambers 40 independently inflatable from each other. In the depicted embodiment, the airbag 32 includes a first chamber 42, a second chamber 44, and a third chamber 46 each being independently inflatable from each other. Each of the chambers 40 may have different pressures for different body regions of the vehicle occupant O to enhance the protection of the vehicle occupant. An anchor 45 (e.g., rod) may be directly coupled to the airbag 32 and the vehicle-occupant support 18 to maintain the airbag 32 coupled to the vehicle-support 18 even during deployment of the airbag 32. The inflatable blanket 20 with the chambers 40 may be custom-made for the vehicle occupant O based on biometric data. The biometric data may include, but is not limited to, occupant weight, height, upper torso height, and/or lower extremity length of the vehicle occupant O. The biometric data may be provided by the customers when they purchase the vehicle at the dealership and the deployable sleeping airbag can be tailored to the customers at the dealership. Other possible ways to gather the biometric data is relying on a camera sensor and then analyzing the images to obtain the required information.

Figure 10:
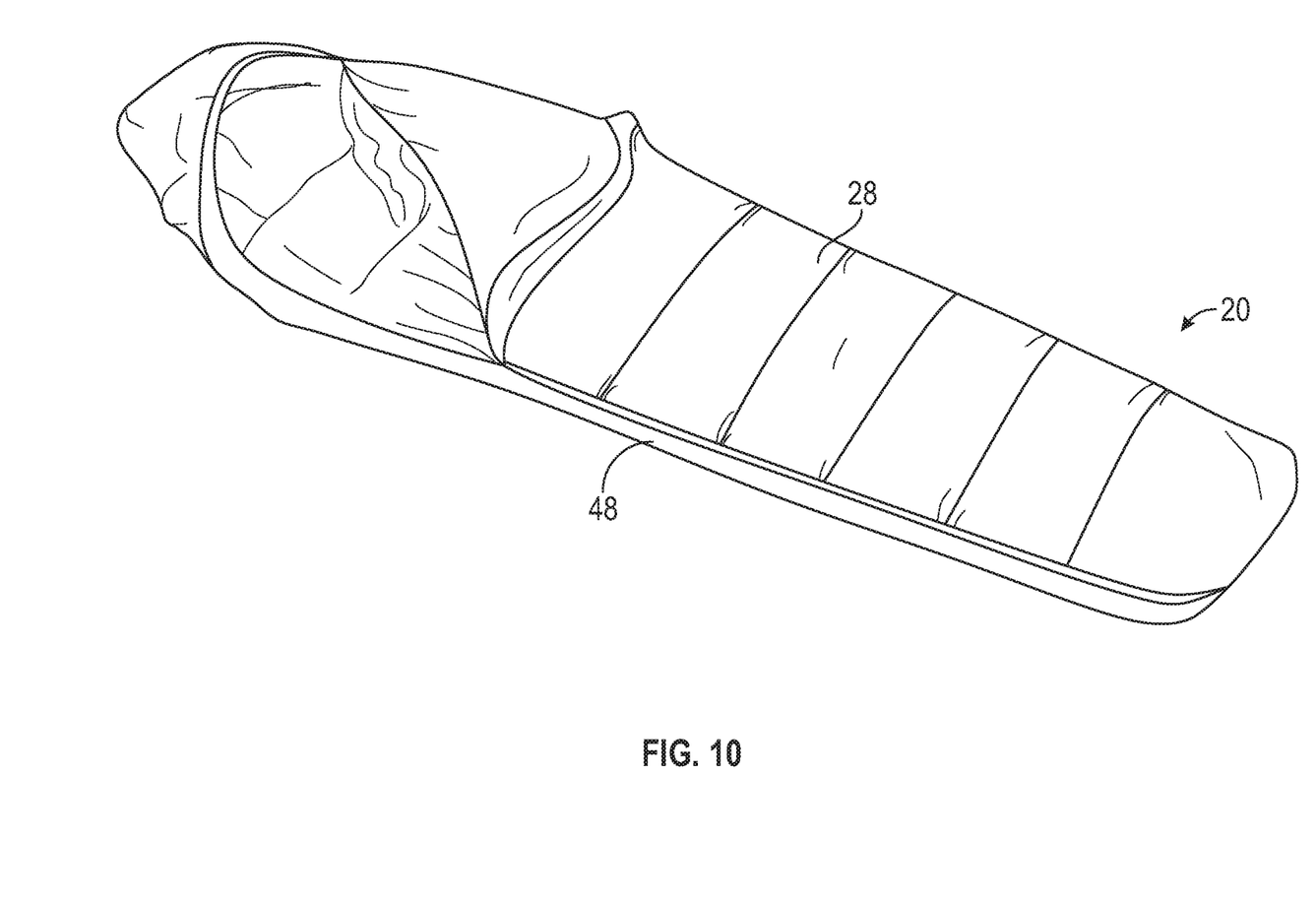
FIG. 10 is a schematic perspective view of an inflatable blanket configured as a sleeping bag.

With reference to FIG. 10, the inflatable blanket 20 may be configured as a sleeping bag. As such, in addition to the first blanket layer 28 and the second blanket layer 29, the inflatable blanket 20 includes blanket layers 48 to cover the back of the vehicle occupant O.

Figure 11:
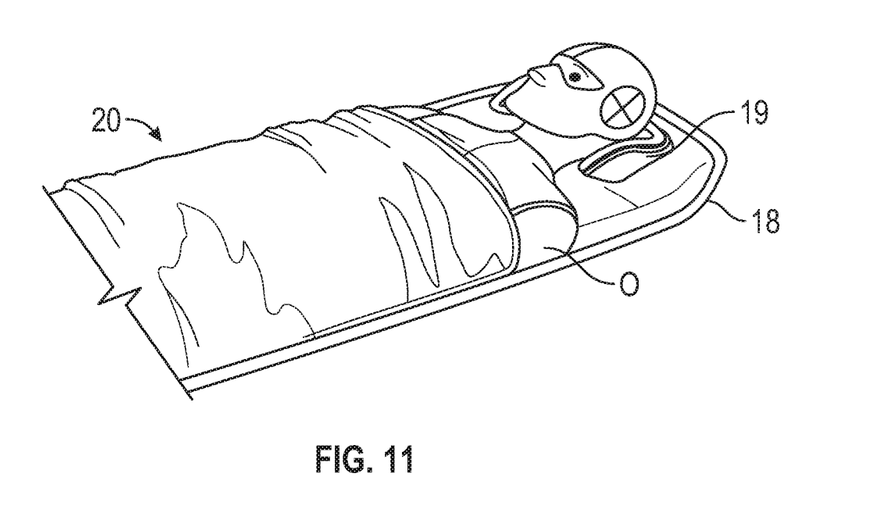
FIG. 11 is a schematic perspective view of an inflatable blanket not covering the head of the vehicle occupant and including an independent headrest airbag that may be deployed to protect the head, wherein the airbag is in the stowed position.
Figure 12:
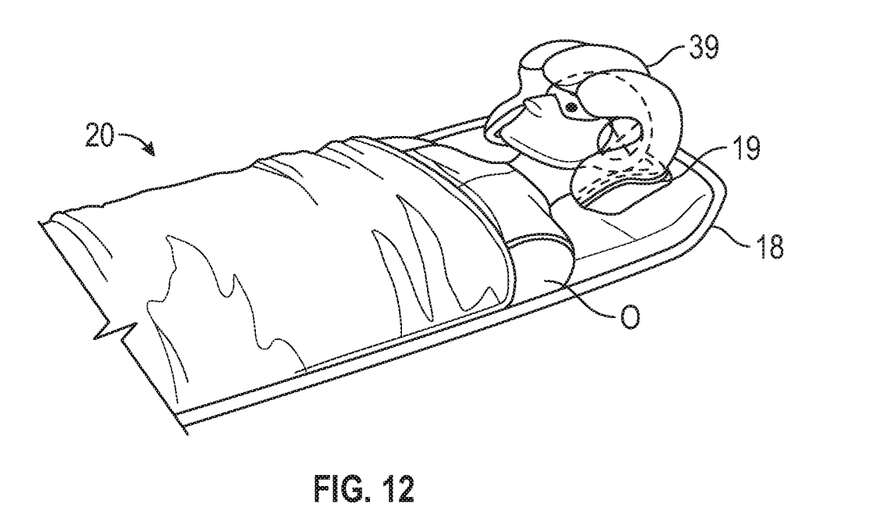
FIG. 12 is a schematic perspective view of an inflatable blanket not covering the head of the vehicle occupant and including an independent headrest airbag that may be deployed to protect the head, wherein the airbag is in the deployed position.

With reference to FIGS. 11 and 12, the inflatable blanket 20 does not cover the head of the vehicle occupant. The vehicle-occupant support 18 includes a headrest 19 and a headrest airbag 39 having a deflated configuration (FIG. 11) and an infatuated configuration (FIG. 12). In the deflated configuration, the headrest airbag 39 is disposed inside the headrest 19. In the inflated configuration, the headrest airbag 39 is disposed outside the headrest 19. Upon receipt of the external force EF to the vehicle body 12 (FIG. 2), the controller 30 commands the headrest airbag 39 to deploy to protect the head of the vehicle occupant O. The headrest airbag 39 may be deployed independently of the airbag 32. In the inflated configuration, the headrest airbag 39 covers the back and the sides of the head of the vehicle occupant O, but not the face of the vehicle occupant O.

Figure 13:
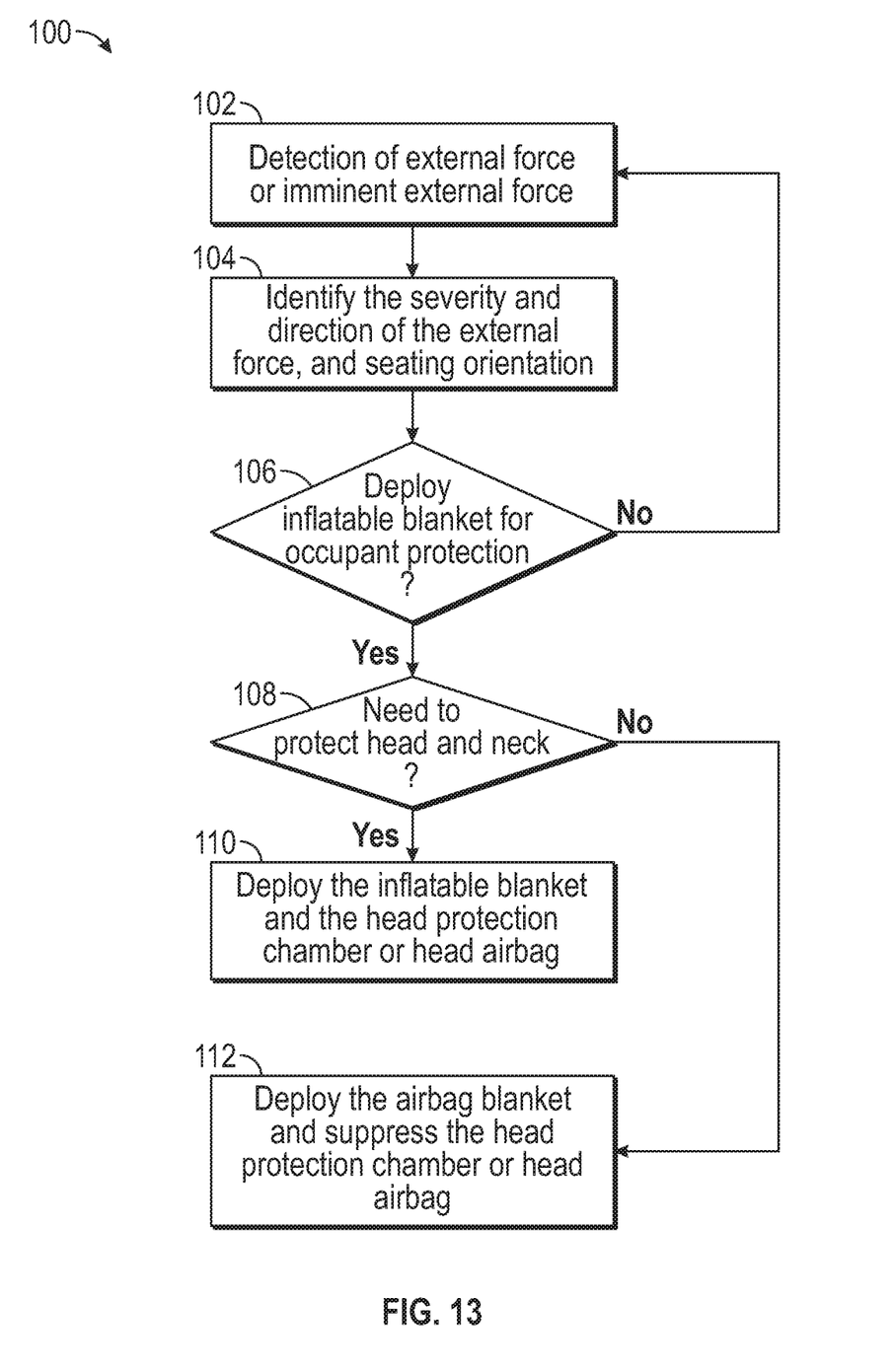
FIG. 13 is a flowchart of a method for operating an airbag system.

With reference to FIG. 13, the controller 30 is in communication with the inflatable blanket 20 and is programmed to control the deployment of the airbag 32 based on the method 100. The method 100 begins at block 102, which entails detecting whether the external force EF (FIG. 2) has been applied to the vehicle body 12 of the vehicle 10 based on signals received from the first sensor 31. Alternatively or additionally, at bloc, 102, the controller 30 determines whether the application of the external force EF to the vehicle body 12 of the vehicle 10 is imminent based on the signals received from the third sensor 36 (i.e., the vehicle speed sensor) and the fourth sensor 35 (i.e., the lidar system and/or the camera). Then, the method 100 proceeds to block 104.

At block 104, the controller 30 determines whether a magnitude (i.e., severity) of the external force EF applied to the vehicle body 12 of the vehicle 10 based on signals received from the first sensor 31. Also, at block 104, the controller 30 determines the direction of the external force EF applied to the vehicle body 12 of the vehicle 10 based on signals received from the first sensor 31. Block 104 also entails determining, by the controller 30, the current position of the vehicle-occupant support (e.g., the vehicle seat) with respect to the vehicle floor 14 to determine the seating orientation of the vehicle occupant based on signals received from the second sensor 34. Then, the method 100 proceeds to block 106.

At block 106, the controller 30 determines whether the inflatable blanket 20 should be deployed to protect the vehicle occupant O when the vehicle body 12 of the vehicle 10 is subjected to an external force EF based on the magnitude of the external force EF. In other words, the controller 30 determines whether the airbag 32 of the inflatable blanket 20 should be deployed to protect the vehicle occupant O based on the magnitude of the external force EF. To do so, the controller 30 determines whether the magnitude of the external force EF applied to the vehicle body 12 of the vehicle 10 is greater than a predetermined magnitude threshold. If the controller 30 determines that the magnitude of the external force EF applied to the vehicle body 12 of the vehicle 10 is greater than the predetermined magnitude threshold, then method 100 continues to block 108. However, if the determines that the magnitude of the external force EF applied to the vehicle body 12 of the vehicle 10 is not greater than the predetermined magnitude threshold, then the method 100 returns to block 102.

At block 108, the controller 30 determines whether the head and neck of the vehicle occupant O should be protected based on the direction of the external force EF applied to the vehicle body 12 of the vehicle 10 and the current position of the vehicle-occupant support 18 (i.e., a reclinable vehicle seat). To do so, the controller 30 determines whether the direction of the external force EF applied to the vehicle body 12 of the vehicle 10 is a predetermined direction and whether the current position of the vehicle-occupant support 18 (i.e., a reclinable vehicle seat) is a predetermined vehicle position. If the direction of the external force EF applied to the vehicle body 12 of the vehicle 10 is the predetermined direction and the current position of the vehicle-occupant support 18 (i.e., vehicle seat) is the predetermined vehicle position, then the method 100 proceeds to block 110. However, if either the direction of the external force EF applied to the vehicle body 12 of the vehicle 10 is not the predetermined direction or the current position of the vehicle-occupant support 18 (i.e., a reclinable vehicle seat) is not the predetermined vehicle position, then the method 100 continues to block 112.

At block 112, the controller 30 commands the airbag 32 to deploy and suppresses the head protection portion 23 from deploying. At block 110, the controller 30 commands the airbag 32 and the head protection portion 23 to deploy.

While the best modes for carrying out the disclosure have been described in detail, those familiar with the art to which this disclosure relates will recognize various alternative designs and embodiments for practicing the disclosure within the scope of the appended claims.

What is claimed is:

1. An airbag system, comprising:
   a vehicle-occupant support configured to bear a weight of a vehicle occupant;
   an inflatable blanket coupled to the vehicle-occupant support, wherein the inflatable blanket includes:
   a first blanket layer;
   a second blanket layer coupled to the first blanket layer;
   an airbag disposed between the first blanket layer and the second blanket layer, the airbag including a main portion and a head protection portion, the head protection portion having a deployed state and a stowed state, the head protection portion is tucked inside the first blanket layer and the second blanket layer in the stowed state, and the head protection portion extends from the main portion to protect a head of the vehicle occupant in the deployed state;
   wherein the airbag has a deflated configuration and an inflated configuration to protect the vehicle occupant when a vehicle is subjected to an external force; and
   a controller in communication with the inflatable blanket, wherein the controller is programmed to:
   detect that the external force has been applied to the vehicle;
   determine a magnitude of the external force applied to the vehicle;
   determine a direction of the external force applied to the vehicle;
   command the airbag to inflate the main portion and suppress the head protection portion from deploying in response to: (1) determining that the external force has been applied to the vehicle, (2) determining that the magnitude of the external force applied to the vehicle is greater than a predetermined magnitude threshold, and (3) determining that the direction of the external force applied to the vehicle is not a predetermined direction.

2. The airbag system of claim 1, wherein the vehicle-occupant support is a vehicle seat.

3. The airbag system of claim 1, further comprising a seatbelt partly disposed between the first blanket layer and the second blanket layer to selectively connect the inflatable blanket to the vehicle-occupant support of the vehicle.

4. The airbag system of claim 1, wherein the airbag is entirely disposed between the first blanket layer and the second blanket layer.

5. The airbag system of claim 1, wherein the vehicle-occupant support is a vehicle flat bed frame.

6. The inflatable blanket of claim 5, wherein the head protection portion is a head protection chamber of the airbag, and the head protection chamber is inflatable independently of a rest of the airbag.

7. The inflatable blanket of claim 5, wherein the airbag is a main airbag, the head protection portion is a head protection airbag, and the head protection airbag is inflatable independently of the main airbag.

8. The inflatable blanket of claim 1, wherein the airbag includes a plurality of chambers independently inflatable from each other.

9. The inflatable blanket of claim 1, wherein the inflatable blanket is configured as a sleeping bag.

10. The airbag system of claim 1, further comprising a first sensor configured to detect the external force applied to the vehicle, wherein the first sensor is configured to determine the magnitude of the external force applied to the vehicle and the direction of the external force applied to the vehicle, the controller is programmed to determine the magnitude of the external force applied to the vehicle based on a signal from the first sensor, the controller is programmed to determine the direction of the external force applied to the vehicle based on the signal from the first sensor.

11. The airbag system of claim 10, further comprising a second sensor coupled to the vehicle-occupant support and the controller, wherein the signal is a first signal, the controller is in communication with the second sensor, the second sensor is configured to detect a current position of the vehicle-occupant support relative to a vehicle floor of the vehicle, and the controller is programmed to determine the current position of the vehicle-occupant support relative to the vehicle floor based on a second signal from the second sensor.

12. The airbag system of claim 11, wherein the controller is programmed to:
   determine that the current position of the vehicle-occupant support is not a predetermined position; and
   command the airbag to inflate the main portion and suppress the head protection portion in response to: (1) determining that the external force has been applied to the vehicle, (2) determining that the magnitude of the external force applied to the vehicle is greater than the predetermined magnitude threshold, (3) determining that the direction of the external force applied to the vehicle is not the predetermined direction, and (4) determining that the current position of the vehicle-occupant support relative to the vehicle floor is not the predetermined position.

13. The airbag system of claim 12, wherein the controller is programmed to:
   determine that the current position of the vehicle-occupant support is the predetermined position; and
   command the airbag to inflate the main portion and the head protection portion in response to: (1) determining that the external force has been applied to the vehicle, (2) determining that the magnitude of the external force applied to the vehicle is greater than the predetermined magnitude threshold, (3) determining that the direction of the external force applied to the vehicle is the predetermined direction, and (4) determining that the current position of the vehicle-occupant support is the predetermined position.

* * * * *